Nov. 25, 1958
J. CHRISTMAN, JR
2,862,196
BRAKE SAFETY DEVICE
Filed Dec. 1, 1955
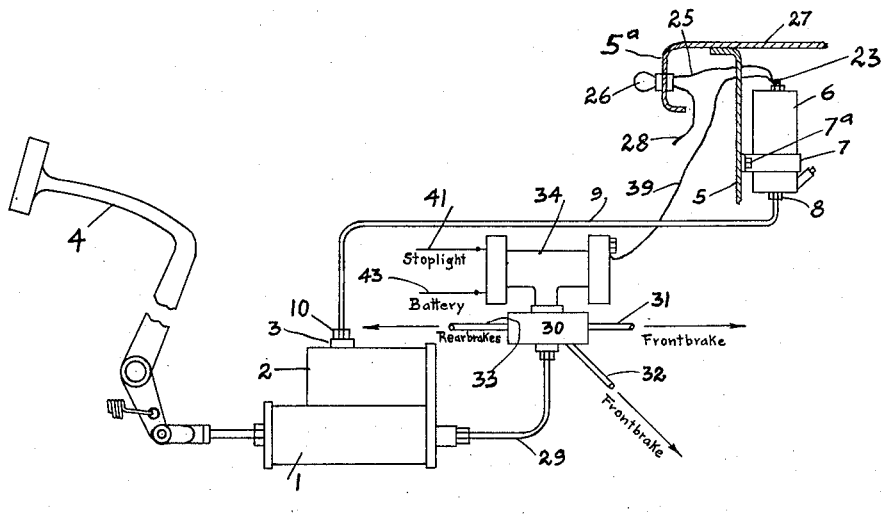
Fig. 1.
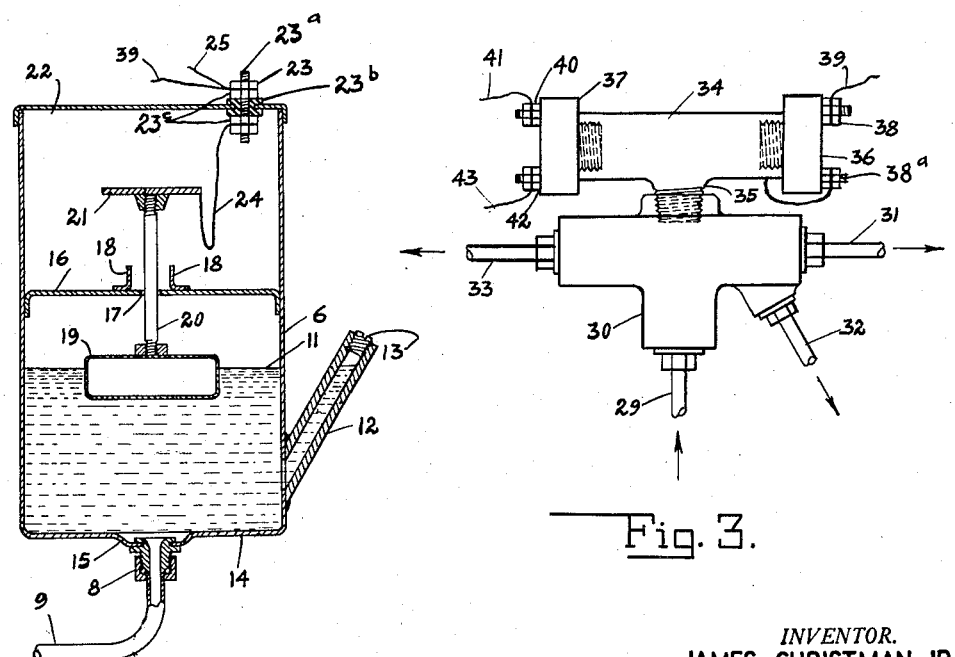
Fig. 2.
Fig. 3.
INVENTOR.
JAMES CHRISTMAN JR
BY
Christy, Parmelee & Strickland
ATTORNEYS.

United States Patent Office 2,862,196
Patented Nov. 25, 1958

2,862,196
BRAKE SAFETY DEVICE
James Christman, Jr., Farrell, Pa.
Application December 1, 1955, Serial No. 550,436
2 Claims. (Cl. 340—52)

The present invention pertains in general to fluid actuated vehicle brakes such as are commonly used on passenger automobiles, commercial trucks and airplanes. Specifically the invention provides a continuing indication of the supply of brake fluid within the brake system and means for conveniently replenishing such supply.

Fluid actuated braking systems, commonly referred to as hydraulic brakes, for vehicles are standardized today as to construction and operation. Basically all such braking systems comprise a master cylinder, individual wheel brake cylinders, conduits connecting such wheel cylinders with the master cylinder, and means for actuating the master cylinder to pressurize the fluid in said cylinders and conduits to actuate the wheel brakes. Each such master cylinder is provided with a reservoir holding a supply of brake fluid necessary for the operation of the system and a small excess supply of fluid to compensate for losses of fluid due to leaks in such system. For the purpose of replenishing such fluid lost through leakage, the master cylinder reservoir is provided with a filling opening.

By reason of a foot actuated brake pedal being the usual actuating means for the brake master cylinder, such cylinder and its associated reservoir are frequently mounted upon the vehicle in a position where the reservoir is not readily accessible for checking the fluid supply. The checking operation is not conveniently performed by the vehicle driver and is usually left to the discretion of a garage or other service station attendant who may or may not do so. When the brake fluid supply in the reservoir is deficient, the brakes will not deliver the rated fluid pressure to the wheel brake cylinders and the resultant deficiency in braking power may cause an accident due to the inability of the driver to stop the vehicle in the customary manner. Further more, the vehicle driver has no means between successive applications of the brake of knowing whether the brake fluid supply is adequate or not.

The primary object of the invention is to provide a means for indicating to the vehicle operator at each operation of the brake pedal that a sufficient supply of fluid is present in the system and a continuous indication of a deficiency in safe supply of fluid immediately upon the fluid supply falling below a pre-selected level.

Another object of the invention is to provide a conveniently located readily accessible auxiliary brake fluid reservoir connected with the standard brake system of the vehicle and with the aforesaid indicating means whereby the auxiliary fluid supply is constantly available for operation of the master cylinder and to give prompt and continuous indication, during operation of the vehicle, that such auxiliary supply is exhausted.

A further object of the invention is to provide such indicating means and auxiliary reservoir as an accessory that may be readily mounted upon the vehicle without modification of the standard vehicle braking system.

These and other objects will be made apparent from the following description and the drawings forming a part thereof, in which:

Fig. 1 is a schematic arrangement of the vehicle brake pedal, master cylinder, indicating device and auxiliary fluid reservoir;

Fig. 2 shows in enlarged detail the construction of the auxiliary reservoir; and Fig. 3 shows a preferred means of connecting the indicating device with the brake fluid conduits to actuate the indicating device upon each operation of the brakes.

Referring now in detail to Fig. 1 of the drawings, the brake master cylinder 1 is standard equipment and is provided with a brake fluid reservoir 2 having an opening through the portion 3 thereof for placing brake fluid therein. Such opening is normally closed by a removable plug (not shown). The brake pedal 4 is likewise part of the standard brake equipment and is merely schematically indicated as connected with master cylinder 1 for actuation thereof in the usual manner. Reference character 5 indicates a portion of the vehicle body including the usual fire wall and a portion of the vehicle dash where the usual speedometer and other indicating instruments are mounted. These parts are standard vehicle construction and equipment whose details of design may vary but whose function is constant.

The auxiliary brake fluid reservoir 6 is secured to the vehicle fire wall 5 by a suitable strap bracket 7 and fastening devices 7a. The reservoir 6 is connected by a suitable member 8 to one end of a conduit 9 whose opposite end is connected by a suitable member 10 to the opening 3 of the standard brake master cylinder reservoir 2. Reservoir 6 is a hollow container of suitable shape such as a cylindrical body portion 11 having on one wall thereof a filling spout 12 closed at its outer end by a closure member such as the screw threaded plug member 13. Body portion 11 is closed at one end by bottom wall 14 having a suitable opening 15 therein to which the conduit 9 is connected by member 8. Within body portion 11 is secured a suitable spider 16 having an opening 17 wherein and metal contact members 18 mounted upon the member 16 adjacent opening 17. Supported by brake fluid in reservoir 6 is a float 19 having a stem 20 extending upwardly therefrom through opening 17 of spider 16. Stem 20 is encased by insulating material or may be otherwise suitably insulated from spider 16. Mounted upon the upper end of stem 20 is a metal contact member 21. The top of casing 11 is closed by a suitable member 22 having an electrical terminal 23 mounted thereon. This terminal is insulated from casing 11 and may be of any suitable construction such as a threaded stem 23a surrounded by insulating member 23b and held in position by nuts 23c. The lower end of terminal 23 is connected by a flexible wire loop 24 with float stem member 21. The upper end of terminal 23 has two wires 25 and 39 extending therefrom in a manner to be hereinafter described.

The usual fluid conduit connections between the brake master cylinder 1 and the wheel brake cylinders (not shown), comprise the conduit 29 carrying fluid from cylinder 1 to a distributor 30 having outlet conduits 31 and 32 connected to the front brake cylinders and conduit 33 leading to the rear brake cylinders. The fluid distributor member 30 is standard brake equipment and may vary in details of construction but not function. In one wall of member 30 a suitable threaded opening is provided into which is mounted a T-shaped pipe fitting 34. The opposite openings in fitting 34 have fluid actuated switches 36 and 37 mounted therein. This fitting and switches are standard automotive equipment which may be purchased in the open market. The two terminal switch 37 is standard equipment on many cars having one terminal 42 connected with the car battery by wire 43 and the terminal 40 connected by wire 41 to the rear stop lights. The switch 36 is similar to 37 and has one terminal 38 connected by wire 39 to terminal 23 of the auxiliary reservoir 6 and the opposite terminal 38a grounded to fitting 34.

The indicating device, which for convenience is preferably mounted on the car dash 5a, is shown as a lamp, 26. The lamp bulb may be of any color, red being the usual attention attracting color signal used. One terminal of the lamp is grounded through wire 25 to terminal 23 of reservoir 6. The opposite terminal of lamp 26 is connected to a convenient power source. This power source may be the car battery or preferably the ignition switch, so that when the car ignition is turned on the lamp is connected with the car battery. In this manner the car battery may not be "run down" by the lamp being lighted when the car is in storage for a reason hereinafter set forth.

In assembling of the device upon a vehicle, the auxiliary reservoir 6 is mounted on the fire wall 5 and the conduit 9 of suitable length connected between reservoir 6 and the master cylinder reservoir 2. The lamp 26 is then mounted on a convenient portion of the car dash. One lamp terminal is connected by wire 25 to reservoir terminal 23 and the other lamp terminal is connected by wire 28 to the ignition switch (not shown). The reservoir 6 is filled with brake fluid raising float 19 to lift member 21 off contact points 18. Fitting 34 is then mounted in brake fluid conduit member 30 and the stop light switch 37 is mounted in one end of member 34. Another switch 36 is mounted in the opposite end of fitting 34. One terminal 38 of switch 36 is connected to terminal 23 of reservoir 6 and the other terminal is grounded to member 34 or any other suitable ground.

Before describing the operation of the device of the invention, attention is called to the wiring of the device. Indicator lamp 25 is grounded through reservoir terminal 23 but the ground connection is "open," unless closed by float 19 of reservoir 6 or by switch 36 in the brake line conduit member 34. When the ignition switch is not in "on" position the lamp 26 can not be lighted by closing of the ground circuit through either wire 25 or 39 connected to auxiliary reservoir 6 terminal 23.

When the vehicle driver turns the ignition switch (not shown) to "on" position and the fluid in reservoir 6 is sufficiently depleted to drop float 19 until member 21 rests on contacts 18 within the reservoir, the ground contact is closed through wire 24, spider 16, reservoir 6 and fire wall 5 causing lamp 26 to light giving an immediate signal to the driver before the vehicle is placed in motion. This lamp 26, under such conditions, remains lighted until the brake fluid in reservoir is replaced or the vehicle driver turns off the ignition. The driver may then replace the depleted fluid before starting the car or drive carefully to the nearest garage or service station for replenishing the brake fluid.

After the vehicle is in motion with the ignition switch "on" and the lamp 26 unlighted, operation of the brake pedal 4 causes fluid pressure in member 34 causing switch 36 to close and grounding lamp 26 through wire 25 and 39, causing it to light. Release of brake pedal 4 causes reduction of pressure in member 34 permitting switch 36 to open and extinguishing lamp 26.

In the foregoing manner indicator lamp 26 by flashing "on" and "off" when brake pedal 4 is applied and released indicates to the driver that a reserve of brake fluid is present in reservoir 6 and the lamp is in operating condition. At any time during operation of the vehicle when the lamp 26 is lighted and stays lighted and the brakes are not being applied, the driver is immediately warned that the supply of brake fluid is dangerously low. If, however, during operation of the vehicle and application of the brakes the lamp 26 is not lighted when the brakes are applied, the driver is warned that the lamp or circuit is not functioning and can have repairs made.

In the practice of the invention it is recommended that the reservoir 6 be installed as a sealed unit, having only closure member 13 removable, so that the only method of servicing the reservoir is to replace it. This is a safety feature insuring against carelessness or ignorance in repair in the reservoir alarm. Should the reservoir closure member 22 be removed and through carelessness, or otherwise, wire 24 be broken, the lamp circuit would be closed and opened upon operation of the brakes, but would not be closed upon depletion of fluid in reservoir 6. This method of replacing defective units by certified replacement parts is now practiced by many parts manufacturers.

From the foregoing it will be apparent that an efficient safety device has been provided for notifying the vehicle operator that the vehicle brakes are in a safe or unsafe condition. It also provides a ready and convenient means for replenishing the supply of brake fluid, thus tending to avoid accidents resulting from neglecting to check the fluid supply by reason of the difficulty in obtaining access to the brake master cylinder. It also provides a convenient check by the driver on the brake fluid supply every time he uses the car brake.

It will be obvious to those skilled in the art that various changes in the details of construction may be made without departing from the spirit of the invention disclosed. It is therefore to be understood that the exact details of construction used herein are for purposes of illustration and not limitation except as made necessary by the scope of the appended claims.

I claim:

1. A safe brake fluid supply indicating device for a vehicle having a hydraulic brake system, comprising a housing mounted upon and grounded to a metal part of the vehicle for containing a reserve supply of brake fluid, an internal partition dividing the housing into top and bottom compartments, conduit means connecting the housing and bottom compartment with said brake system, a float in said bottom compartment and having a stem extending upwardly therefrom through said partition into said top compartment, said stem being insulated relative to said partition, a head on said stem within said top compartment, means for supplying brake fluid to said bottom compartment for raising said float head above and out of contact with said partition, a normally open fluid pressure actuated switch in said brake system having one terminal grounded to said vehicle, an electrically actuated signal device mounted on said vehicle and having one terminal connected to said vehicle ignition system through the open side of the ignition switch, a terminal mounted on said housing in insulated relation thereto, a wire connecting the remaining terminal of said signal device with the housing terminal and the remaining terminal of the pressure actuated switch grounding the signal device to the vehicle upon actuation of the said brake system, and means on said partition and float head grounding said signal device through said terminal and housing when the float head engages with said partition means upon depletion of brake fluid in the housing bottom compartment.

2. The indicating device as defined in claim 1, wherein said means on the partition and float head grounding the signal through said housing and terminal comprises, a metal member on said partition in electrical connection with the housing and metal member on said head adapted to engage with the said partition member and having an electrical connection with said housing terminal.

References Cited in the file of this patent

UNITED STATES PATENTS

| | | |
|---|---|---|
| 1,951,882 | Pentecost | Mar. 20, 1934 |
| 2,085,173 | Stansbury | June 29, 1937 |
| 2,161,441 | Vickers | June 6, 1939 |
| 2,377,569 | Morse | June 5, 1945 |
| 2,684,414 | Kilpatrick | July 20, 1954 |
| 2,748,378 | Feins | May 29, 1956 |

UNITED STATES PATENT OFFICE

CERTIFICATE OF CORRECTION

Patent No. 2,862,196                                              November 25, 1958

James Christman, Jr.

It is hereby certified that error appears in the printed specification of the above numbered patent requiring correction and that the said Letters Patent should read as corrected below.

Column 2, line 25, for "site is" read -- site end is --; line 35, for "wherein" read -- therein --.

Signed and sealed this 10th day of March 1959.

(SEAL)
Attest:

KARL H. AXLINE                                        ROBERT C. WATSON
Attesting Officer                                     Commissioner of Patents